US012596106B2

(12) United States Patent　　　(10) Patent No.:　US 12,596,106 B2

Hoffmann　　　　　　　　　　　　(45) Date of Patent:　　　Apr. 7, 2026

(54) ANALYSIS DEVICE AND METHOD FOR DETERMINING AN OSCILLATION PATTERN OF A SUBSTANCE

(71) Applicant: FR-Future1 Franziska Michl und Raimund Hoffmann GbR, Marktredwitz (DE)

(72) Inventor: Raimund Hoffmann, Wunsiedel (DE)

(73) Assignee: FR-Future1 Franziska Michl und Raimund Hoffmann GbR, Marktredwitz (DE)

( * ) Notice: Subject to any disclaimer, the term of this patent is extended or adjusted under 35 U.S.C. 154(b) by 321 days.

(21) Appl. No.: 18/576,834

(22) PCT Filed: Jul. 6, 2022

(86) PCT No.: PCT/EP2022/068694

§ 371 (c)(1),
(2) Date: Jan. 5, 2024

(87) PCT Pub. No.: WO2023/280901

PCT Pub. Date: Jan. 12, 2023

(65) Prior Publication Data

US 2024/0310333 A1　　　Sep. 19, 2024

(30) Foreign Application Priority Data

Jul. 7, 2021　　(DE) ..................... 10 2021 117 510.0

(51) Int. Cl.
G01N 29/32　　　(2006.01)
G01N 29/14　　　(2006.01)
　　(Continued)

(52) U.S. Cl.
CPC ............. G01N 29/32 (2013.01); G01N 29/14 (2013.01); G01N 29/2406 (2013.01); G01N 29/222 (2013.01); G01N 29/4436 (2013.01)

(58) Field of Classification Search
CPC .... G01N 29/32; G01N 29/14; G01N 29/2406; G01N 29/222; G01N 29/4436
(Continued)

(56) References Cited

U.S. PATENT DOCUMENTS

| | | | |
|---|---|---|---|
| 4,401,859 A | 8/1983 | Watson | |
| 2008/0135762 A1* | 6/2008 | Villanucci | ................ G01H 9/00 |
| | | | 250/336.1 |

FOREIGN PATENT DOCUMENTS

| | | |
|---|---|---|
| DE | 69114096 T2 | 7/1996 |
| DE | 69431873 T2 | 11/2003 |
| JP | H0690181 B2 | 11/1994 |

OTHER PUBLICATIONS

Polzat et al: Nitrogen Dioxide Spectroscopy II Determination of by Visible Photoacoustic Analytical Chemistry, American Chemical Society, US, Bd. 54, Nr. 9, 1. Aug. 1982 (Aug. 1, 1982), pp. 1485-1489, XP002406407, ISSN: 0003-2700, DOI: 10.1021/ AC00246A009.

(Continued)

*Primary Examiner* — Peter J Macchiarolo
*Assistant Examiner* — John M Royston
(74) *Attorney, Agent, or Firm* — Hinckley, Allen & Snyder, LLP; David R. Josephs

(57) ABSTRACT

The invention is a method and an analysis device for determining an oscillation pattern of a substance without using an excitation source for the substance. The analysis device comprises a central unit having two identical sample containers, two microphone apparatuses, and a differential amplifier; wherein: one of the microphone apparatuses is located in each of the sample containers; the microphone apparatuses are electronically coupled to the differential amplifier via respective connecting lines; the connecting lines are of identical design; and the differential amplifier is designed to compensate for in-phase parasitic oscillations (Continued)

Figure 1:
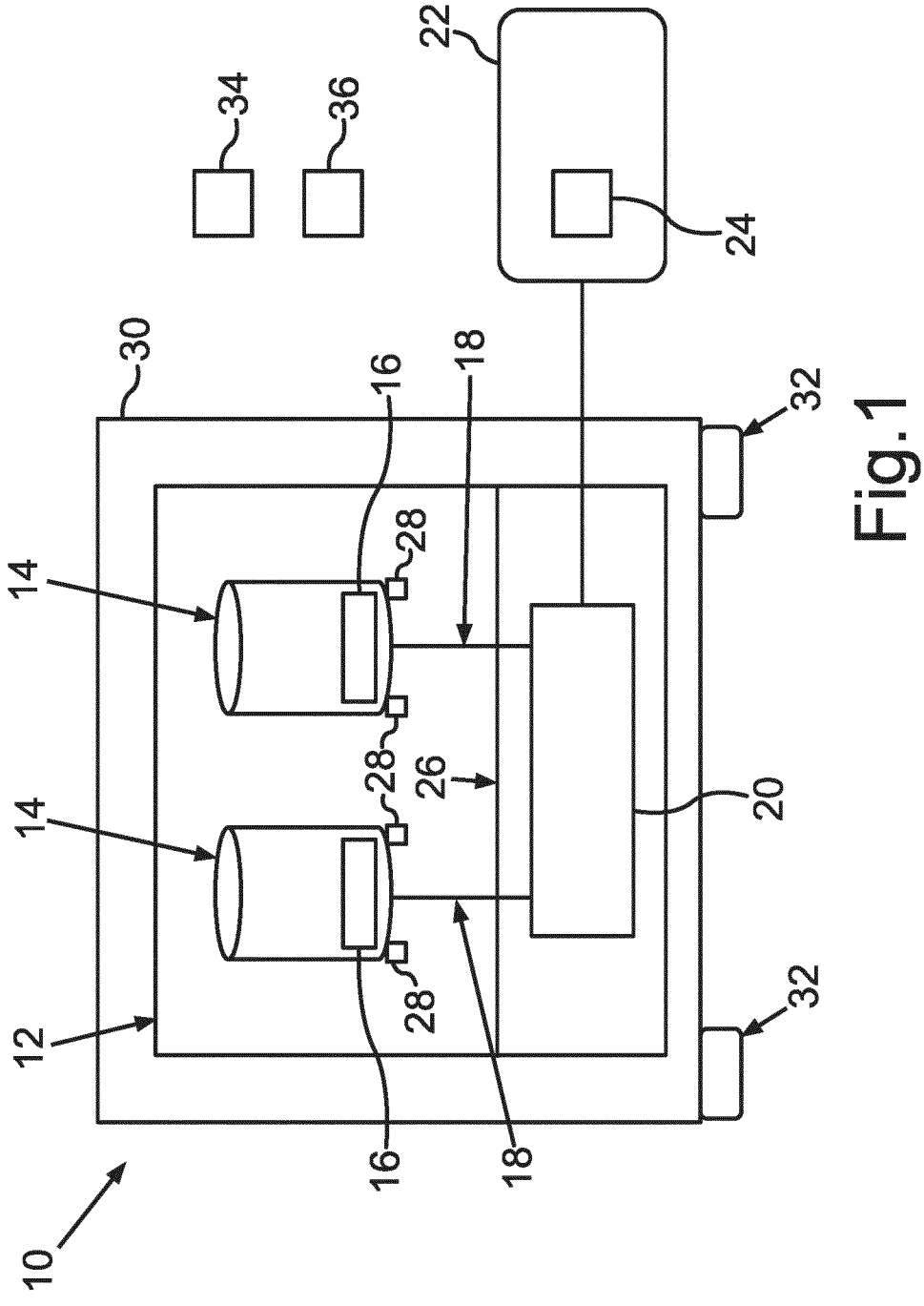

from both sample containers and, when the substance is introduced into one of the two sample containers, to determine the oscillation pattern of the substance without using an excitation source for the substance.

13 Claims, 4 Drawing Sheets

(51) Int. Cl.
*G01N 29/22* (2006.01)
*G01N 29/24* (2006.01)
*G01N 29/44* (2006.01)
(58) Field of Classification Search
USPC ........................................................ 73/570
See application file for complete search history.

(56) References Cited

OTHER PUBLICATIONS

"Shielding (Electrical Engineering)" Wikipedia, https://de.wikipedia.org/wiki/Abschirmung_(Elektrotechnik), Apr. 15, 2021.

* cited by examiner

S10

S12

S14

S16

S18

ANALYSIS DEVICE AND METHOD FOR DETERMINING AN OSCILLATION PATTERN OF A SUBSTANCE

BACKGROUND OF THE INVENTION

The invention relates to an analysis device for determining an oscillation pattern of a substance and to a method for determining such an oscillation pattern.

The determination of oscillation patterns, that is for example frequencies or frequency spectra, which originate from objects or substances, is known in the physics. Thus, oscillation patterns of oscillators, in particular electromagnetic waves or acoustic waves, and radiation spectra of excited objects and/or planets can for example be measured to draw conclusions about the radiation source. Recordable oscillation patterns can for example be electric waves, magnetic waves, electromagnetic waves, mechanic waves, acoustic waves, gravitational waves and matter waves.

Often, the problem in determining these oscillation patterns is in that an intensity of the radiation from a substance or an object is as low as it can disappear in the background noise of measurement technology.

From DE 694 31 873 T2, a photoacoustic analysis apparatus for analyzing fluids and gaseous fluids is known, wherein the principle of photoacoustic apparatuses is based on an interaction with light. The photoacoustic analysis apparatus comprises a reference chamber and a measurement chamber, wherein the reference chamber and the measurement chamber each comprise a detector for sounds, which have been generated by the pulsating light beam in the at least one reference chamber and the at least one measurement chamber. Therein, the pulsating light beam first passes the at least one reference chamber and only thereafter the at least one measurement chamber. By means of this principle, a gas concentration can for example be measured, but it is not suitable to determine the oscillation patterns of substances, because not the oscillation of the substance itself, but of an excitation oscillation is measured, which originates by thermal propagation and cooling the irradiated sample.

From JP H06-90 181 B2, a photoacoustic measurement instrument with open measurement cells is known. In this measurement instrument too, a measurement chamber and a reference chamber are provided, which are open on at least one side, to arrange them on a sample. The sample surface on the measurement chamber is irradiated with a light source, in particular a Xenon lamp or a laser, to measure the photoacoustic effect with microphones. As also already in the previously mentioned analysis apparatus, however, the excitation oscillation is measured herein and not the desired oscillation pattern of the substance. Therefore, both apparatuses are not suitable to solve the above mentioned problems.

From the publication of Polzat O. and Atkinson G. H. ("Determination of Nitrogen Dioxide by Visible Photoacoustic Spectroscopy" Analytical Chemistry, American Chemical Society, Vol. 54, No. 9, Aug. 1, 1982, pages 1485-1489, DOI: 10.1021/AC00246A009), a photoacoustic spectroscopy is known, which is performed with a continuous-wave crypton laser for quantitative detection of $NO_2$ in air samples.

SUMMARY OF THE INVENTION

It is the object of the present invention to provide an analysis device and a method for determining an oscillation pattern of a substance, which minimize the above mentioned problem.

This object is solved by the independent claims. Advantageous developments of the invention are disclosed in the dependent claims, the following description as well as the figures.

By the invention, an analysis device for determining an oscillation pattern of a substance is provided, comprising a central unit with two identical sample containers, two microphone apparatuses and a differential amplifier, wherein one of the microphone apparatuses is respectively arranged in the respective sample containers, wherein the microphone apparatuses are electronically coupled to the differential amplifier via respective connecting lines, wherein the connecting lines are each identically constructed and wherein the differential amplifier is formed to compensate for in-phase parasitic oscillations from both sample containers and to determine the oscillation pattern of the substance upon introduction of the substance into one of the two sample containers.

In other words, the analysis device comprises at least one central unit, which includes two identical sample containers, two microphone apparatuses and a differential amplifier. Thus, the central unit can comprise a measurement arrangement, which is at least required for determining the oscillation pattern. By the two identical sample containers, it is meant that they are constructed identical in nature and in particular have an identical geometry and shape, respectively, and are formed of the same material. Thus, for example two brass tubes can be provided as the sample containers, which have the identical size and the same circumference and which are preferably closable by a lid. In the respective sample container, one of the two microphone apparatuses is arranged, wherein they are preferably arranged in both sample containers in the same position. For example, the microphone apparatuses can both be arranged on the bottom of the respective sample containers. The microphone apparatuses can comprise at least one microphone, which can determine an oscillation pattern. This means, the microphone apparatuses comprise a sound transducer, which can in particular measure an acoustic wave, but also a capacitive or inductive wave.

A connecting line of the respective microphone apparatuses can be led out from the respective sample containers to the differential amplifier, wherein the connecting lines are each identically constructed. Thereby, it is meant that the connecting lines are preferably identically long and are formed of a same material. In particular, the respective connecting line can comprise further amplifiers for the measured signal, wherein they are identically constructed and are controlled with the same parameters in each connecting line.

The differential amplifier or subtractor is an operational amplifier circuit, which comprises at least two inputs and forms the difference between the input signals of the two inputs. This means, the differential amplifier subtracts the signal of the one microphone apparatus from the signal of the other microphone apparatus. Thus, in-phase parasitic oscillations from both sample containers can be compensated for, whereby noise can be minimized. Preferably, the differential amplifier can be adjusted to a zero point before introducing the substance. Upon introduction of the substance into one of the two sample containers, the differential amplifier can then determine the oscillation pattern of the substance. This means that the measured signal at the differential amplifier, which is present after introducing the substance, can be associated with the substance. Therein, each liquid, solid or gaseous element or object can be understood by a substance.

The respective identical sample containers are closable by opaque closing lids, wherein the interior of the sample containers is shielded by walls of the sample containers and the closing lids from optical radiation from all sides after closing. In other words, the interior of the sample containers, that is the measurement chambers, into which the substance can be introduced, is hermetically sealed after closing by the closing lids. Therein, the respective sample containers can be manufactured of an opaque material, for example of plastic or a metal, such that the interior of the sample containers is, in particular hermetically, sealed to the outside by the walls of the sample containers except for an opening for introducing the substance. After introducing the substance through the opening into preferably only one of the two identical sample containers, the respective openings can be completely sealed to the outside by the opaque closing lids, such that the interior of the sample containers, in particular the substance, is substantially shielded from external influences, in particular from light. Accordingly, the substance is hermetically sealed in one of the two identical sample containers and the other one of the two sample containers remains empty as a reference and is also light-tight sealed.

Furthermore, the analysis device is formed to determine the oscillation pattern of the substance without the use of an excitation source for the substance. This means that the analysis device does not comprise an excitation source, by which the sample containers and/or the substance in one of the two sample containers could be excited. In particular, the analysis device does not comprise a light source as the excitation source, in particular no laser, no speaker for acoustic excitation, no heat source and/or no radiation source. Accordingly, only the substance in the normal state, that is at room temperature and preferably with exclusion of further external influences, is to be measured by the analysis device.

By the invention, the advantage arises that oscillation patterns of low intensity can also be determined in improved manner since interfering signals can be compensated for during the measurement. By the identical configuration of the sample containers and the connecting lines, an influence of them on the measurements can be compensated for.

Furthermore, it is provided that the two sample containers are mounted by oscillation-damping elements. In the determination of the oscillation pattern, many disturbing factors can influence the measurement. Thus, a vibration in the environment of the analysis device can for example falsify the measurement signal. For example, impact sound can generate unwanted oscillations. In order to minimize this effect, the sample containers can be mounted by oscillation-damping elements. An oscillation-damping element can for example be an elastic element such as for example rubber or a spring. The oscillation-damping element is preferably formed to absorb and reduce or compensate for the oscillations. Thus, the sample containers can for example be arranged on rubber feet. Hereby, the advantage arises that disturbing influences can be further minimized.

Additionally, it is provided that the central unit is formed as a Faraday cage. In other words, a Faraday cage can be arranged around the sample containers, the microphone apparatuses and the differential amplifier, which acts as an electrical shield and keeps electromagnetic fields from the outside away. For example, the Faraday cage can be achieved by a housing of the central unit, which is provided as a conductive grid or closed structure. In particular, the central unit can be formed as an aluminum housing around the above mentioned components. Hereby, the advantage arises that electronic disturbing influences from outside of the central unit can be shielded, whereby the measurement of the spectral pattern improves.

In addition, it is provided that the analysis device comprises a sound-absorbing housing, wherein the central unit is arranged in the sound-absorbing housing. The sound-absorbing housing can be formed to minimize a propagation of air or structure-bound sound in that the sound is attenuated or absorbed. For example, this can be achieved by porous or elastic absorption materials or by resonators, for example Helmholtz resonators. Preferably, the sound absorption can be achieved by means of an acoustic foam or pyramid foam, which can particularly beneficially and effectively keep sound waves away from the central unit. Hereby, the advantage arises that interfering signals can be further minimized in the determination of the oscillation pattern.

The invention also includes forms of configuration, by which additional advantages arise.

A form of configuration provides that the analysis device comprises a computer device with a storage unit, wherein the computer device is formed to digitally store the oscillation pattern of the substance in the storage unit. Preferably, the oscillation pattern can be digitally stored in the storage unit in the form of an audio file. For example, the computer device can be a computer or a computer cloud and the storage unit can comprise a non-volatile memory. For example, the storage unit can be a hard disk or a flash memory. For picking off the measurement signal from the central unit, the central unit can comprise a cinch socket, at which a soundproofed and shielded cable is led out to the computer device. By this form of configuration, the advantage arises that the measured oscillation patterns of the substance are digitally present and can be further processed.

Advantageously, it is provided that the microphone apparatuses comprise a capacitor microphone. In particular, an extremely low-noise capacitor microphone with high linearity and integrated field effect transistor pre-amplifiers can be used as the capacitor microphone. The use of a capacitor microphone offers the advantage that a very low-noise electroacoustic transducer with high linearity can be provided.

In a further advantageous configuration, it is provided that the microphone apparatuses comprise an acoustic lens. This means that the measurement signal of the oscillation pattern can be amplified by an acoustic lens in each sample container. An acoustic lens can be an acoustic crystal, which has different refractive indices for sound waves. Thus, certain parasitic frequencies can be filtered out and the actual signal can be amplified. Preferably, the microphones of the microphone apparatuses can be arranged on the bottom of the sample containers and be covered by the acoustic lens. Thus, an improvement in the determination of the oscillation pattern of the substance can be achieved.

Preferably, it is provided that the differential amplifier is electromagnetically shielded from the sample containers and the microphone apparatuses by a shielding chamber, wherein the shielding chamber is formed as a Faraday cage. In other words, the differential amplifier within the central unit is again electromagnetically shielded from the sample containers or measurement chambers. For example, this can also be achieved by means of a Faraday cage, which shields the differential amplifier within the central unit. Preferably, a power supply, which supplies the differential amplifier and the microphone apparatuses with current, is also outside of the central unit to minimize the interspersal of magnetic fields. By the arrangement of the differential amplifier in the shielding chamber and/or by the use of an external power supply, the advantage arises that disturbing influences on the sample containers and thus on the determination of the oscillation pattern can be minimized.

Particularly preferably, it is provided that the sound-absorbing housing is mounted by oscillation-damping housing elements. In other words, the sound-absorbing housing, in which the central unit is arranged, can also be additionally mounted by housing elements, which act in oscillation-damping manner. Thus, oscillation carriers can be attached to the housing, which absorb mechanical oscillations and can convert them for example into another form of energy, in particular thermal energy. By this form of configuration, the advantage arises that disturbing effects can be further minimized.

In a further form of configuration, it is provided that the analysis device comprises an oscillation measurement device, which is formed to determine an influence of external oscillations as an oscillation signal and to provide an oscillation warning signal if the oscillation signal is above a preset oscillation threshold value. In other words, the oscillation measurement device can measure an influence of external oscillations, for example by impact sound, and examine if this measured oscillation signal is above a preset oscillation threshold value. If this is the case, an oscillation warning signal can be provided. The oscillation warning signal can indicate a disturbance of the measurement such that a user knows that the measurement has to be repeated. The oscillation warning signal can for example be provided in the form of a display, for example a lamp. Alternatively or additionally, the oscillation warning signal can also be provided as a control signal, by which the measurement results can be automatically discarded and the measurement can be restarted. The oscillation threshold value can preferably be selected very sensitive to keep an influence of external oscillations, in particular impact sound, on the measurement low.

In a further advantageous form of configuration, it is provided that the analysis device comprises a spectrum analyzer device, which is formed to determine an electromagnetic interfering signal and to provide an interference warning signal if the electromagnetic interfering signal is above a preset interfering signal threshold value. In other words, the spectrum analyzer device can comprise a spectrum analyzer and/or an oscilloscope, which can determine electromagnetic oscillations in the environment as an interfering signal. Thus, with many apparatuses located in the environment, electromagnetic oscillations can for example arise, so-called electric smog, or electromagnetic interfering fields can be present by geopathic interfering zones in the environment. If these electromagnetic interferences in the environment are too great, the measured interfering signal can be above a preset interfering signal threshold value, whereby the spectrum analyzer device can provide an interference warning signal. The interference warning signal can for example be displayed via a display, in particular a lamp, or be provided as a control signal, by which the measurement is aborted. By this form of configuration, the advantage arises that electromagnetic influences from the environment can be detected and it can thus be excluded that the measured oscillation pattern has been influenced by electromagnetic environmental influences.

A further aspect of the invention relates to a method for determining an oscillation pattern of a substance with an analysis device according to any one of the preceding forms of configuration. As the steps, the method includes arranging a substance in one of the two sample containers, closing the sample containers and/or the central unit, and measuring the oscillation pattern at the differential amplifier for a preset measurement duration. In other words, the substance is first arranged in one of the two sample containers, wherein the other sample container remains empty. Subsequently, the two sample containers can be closed, for example with closing lids, and/or the central unit, which is preferably formed as a Faraday cage, is closed. Then, the measurement can be started in that a signal of the substance is measured at the differential amplifier, which represents the oscillation pattern, wherein the measurement can preferably have a preset measurement duration. For example, a minimum measurement duration can be set, in particular 25 s. For handling the substance and for introducing the sample (substance) to be digitized, protective devices like gloves, tweezers and/or filter masks are preferably used to avoid a contamination of the sample containers. Thus, white thread gloves can preferably be worn and tweezers suitable as gripping tools can be used. By the method, the same advantages and possibilities of variation as in the analysis device arise.

Preferably, it is provided in the method that a signal of the differential amplifier is compensated for before arranging the substance in one of the sample containers. This means that before the measurement is started, the sample containers and/or the central unit can be closed without a substance being in one of the sample containers. The differential amplifier can then be adjusted to a zero point before the above described method is performed. Thus, it can be ensured that in-phase parasitic oscillations from both sample containers are compensated for.

Particularly preferably, it is provided that a protective vessel, in particular a glass tube, with the substance is arranged in the sample container and a further identical protective vessel without the substance is arranged in the other sample container. By the protective vessel, it can be avoided that the substance remains in the sample container after the measurement and possibly contaminates it. By means of a protective vessel, a liquid substance can for example also be introduced into the sample container in simplified manner. In order that the protective vessel, which can in particular be a glass tube, does not falsify the measurement, an identical protective vessel without the substance is introduced into the other sample container. Here, a protective vessel of identical construction, identical shape and identical materials is again meant by the identical protective vessel. Hereby, the advantage arises that a symmetry is not disturbed in the measurement of the oscillation pattern.

In a further form of configuration of the method, it is provided that the central unit is arranged in a sound-absorbing housing before measuring the oscillation pattern. Thus, acoustic disturbing influences from the outside can in particular be minimized in measuring the oscillation pattern.

Before or during the measurement of the oscillation pattern, environmental influences of the environment can preferably also be monitored for the presence of an oscillation signal and/or an electromagnetic interfering signal, wherein the measurement can be discarded or aborted and restarted if such a signal is present. Hereto, an oscillation measurement device and/or a spectrum analyzer device can preferably be used, which monitor their respective measurement signal and examine it for exceeding a preset threshold value. Thus, disturbing influences from the environment can advantageously be recognized and excluded in advance.

BRIEF DESCRIPTION OF THE DRAWING FIGURES

Figure 2:
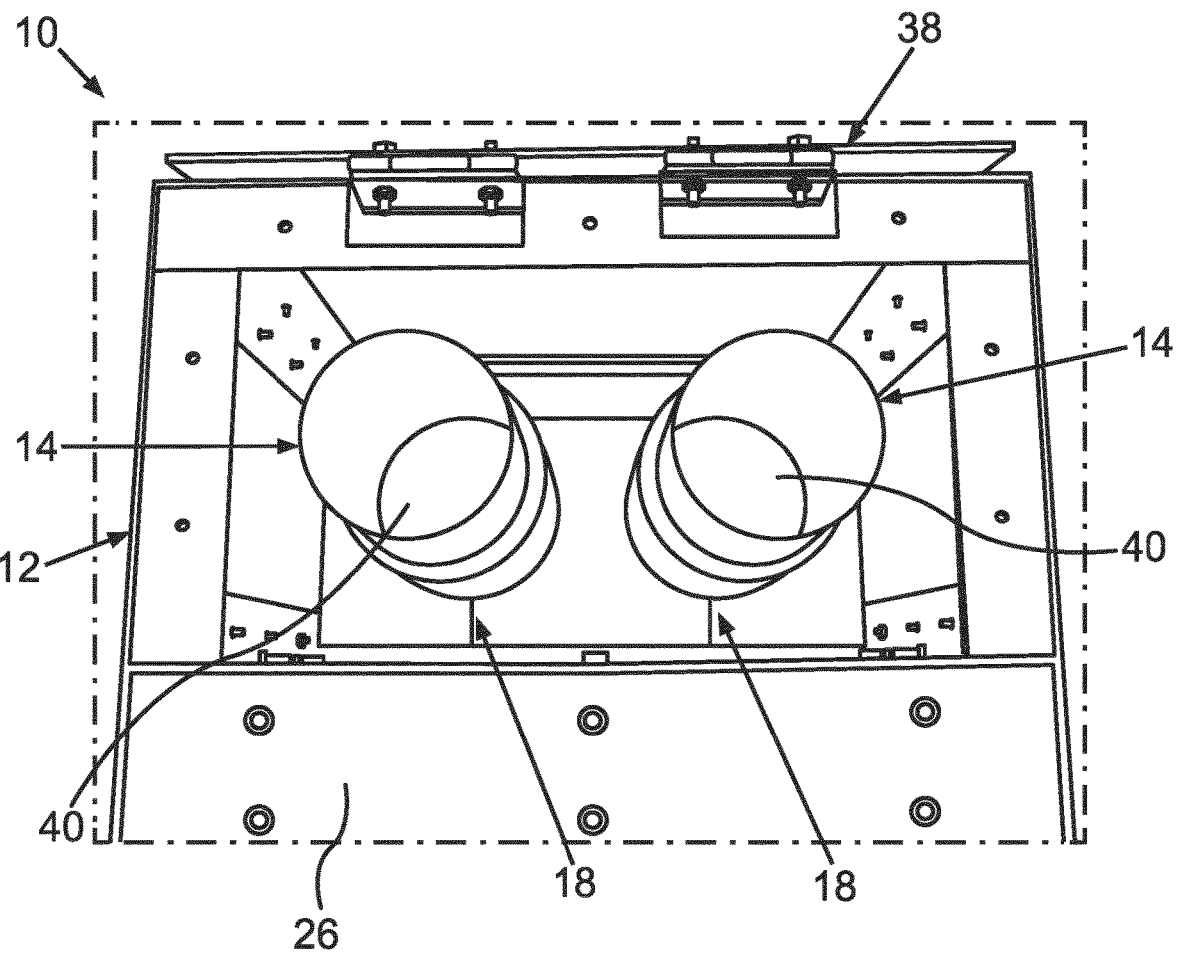
Figure 3:
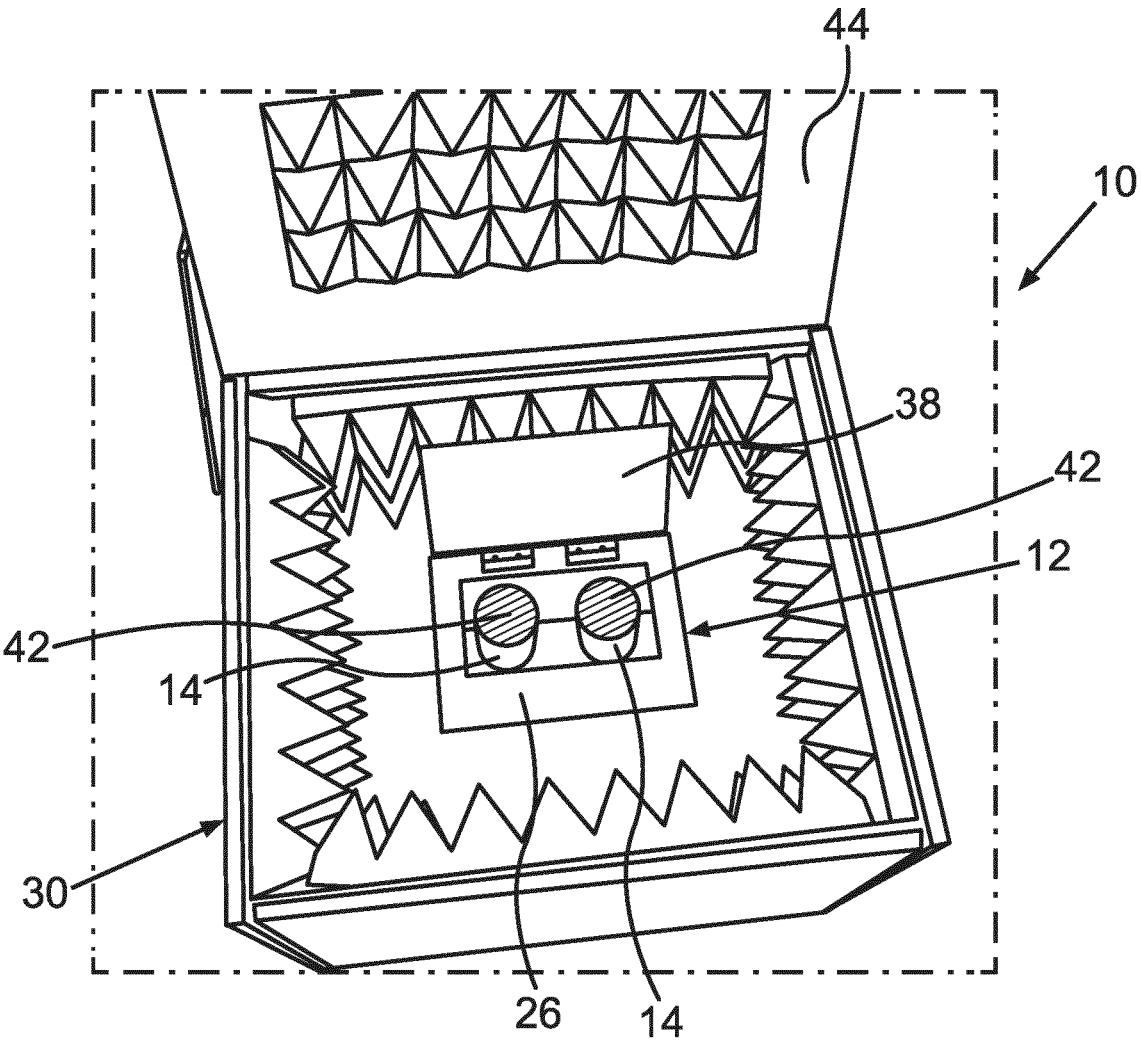
Figure 4:
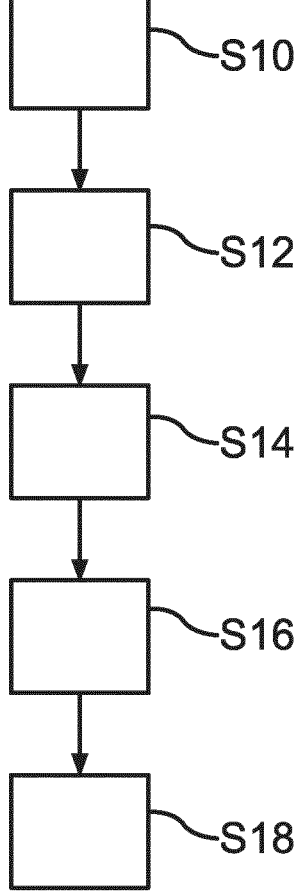

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims. There shows:

FIG. 1 a schematic representation of an analysis device according to an exemplary embodiment;

FIG. 2 a perspective representation of an analysis device according to an exemplary embodiment;

FIG. 3 a perspective representation of an analysis device according to a further exemplary embodiment;

FIG. 4 a schematic method diagram according to an exemplary embodiment.

In the figures, identical or functionally identical elements are provided with the same reference characters.

DESCRIPTION OF THE INVENTION

In FIG. 1, an analysis device 10 for determining an oscillation pattern of a substance according to an exemplary embodiment is illustrated. The analysis device 10 can comprise a central unit 12, wherein the central unit 12 includes two sample containers 14, which are identically formed. Herein, by identically, it is meant, that they have the same shape and are manufactured of the same material. The sample containers 14, which can also be referred to as mechanical receptacles, can in particular be two brass tubes, which are preferably closable by a lid (not shown in this figure).

A microphone apparatus 16 can respectively be arranged in the respective sample containers 14, which are preferably arranged in the bottom of the sample containers 14. For example, a microphone of the microphone apparatuses 16 can be retained in a preset position in a rubber retainer in the bottom of the sample containers 14.

Preferably, extremely low-noise capacitor microphones with high linearity and integrated field effect transistor pre-amplifiers can be used as the microphone or transducer element of the microphone apparatuses 16, which have a frequency range between 20 Hz and 20 KHz and a gain factor of 3 dB. The two capacitor microphones are in the bottom of the sample containers 14 below a respective acoustic lens (not shown in this figure), wherein the acoustic lens filters and amplifies the signal in the desired frequency range. The microphone apparatuses preferably comprise similar microphone amplifiers (input amplifiers) with a gain of respectively 40 dB and a rate of rise of 9 V/µs with an input noise of 5 nV/Hz$^2$. The frequency range and the linearity of the input amplifiers are preferably at 230 Hz-2 dB and at 120 kHz (−3 dB). Herein, a limitation in the lower frequency range serves for impact sound suppression. The above mentioned indications are identical for both microphone apparatuses 16 such that identical signals are generated.

The microphone apparatuses 16 are electronically coupled to a differential amplifier 20 via respective connecting lines 18, wherein the connecting lines 18 are each identically constructed. The identical construction of the connecting lines 18 means that an equal cable length and an equal material, in particular an equal attenuation factor, is present for the connecting lines 18. Preferably, the capacitor microphones of the microphone apparatuses 16 are connected to the inputs of the differential amplifier 20 with a gain of 0 dB on the output side. The differential amplifier 20 allows adjusting the input signals to zero if both input signals are identical. The electrical basic data of the differential amplifier 20 can correspond to those of the input amplifiers of the microphone apparatuses 16.

Thus, the signals of the microphone apparatuses 16 can be amplified in the electronics and then be subtracted from each other in the differential amplifier 20 such that the result of in-phase signals is zero. Thus, in-phase parasitic oscillations from both sample containers 14 can be compensated for in the differential amplifier 20.

Now, if a substance or a sample or an object is introduced in one of the two sample containers, a signal of the substance can be determined as an oscillation pattern in the differential amplifier 20. This means that a signal, which is measured in the differential amplifier 20 after adjustment to zero, can be associated with the substance. The substance can preferably be positioned in an own protective vessel, in particular a glass tube, in the sample container 14. This has the advantage that a contamination can be avoided and also liquid substances can be arranged in the sample container 14.

An oscillation pattern measured at the differential amplifier 20 can be forwarded from the central unit to a computer device 22, wherein the central unit for example comprises a cinch socket hereto, via which a cable can be led to the computer device 22. The computer device 22 can comprise a storage unit 24, which can in particular be a non-volatile memory. On this storage unit 24, the oscillation pattern of the substance can then be digitally stored. Thus, a database with multiple substances and the respective oscillation patterns thereof can preferably be generated.

For avoiding disturbing influences, the central unit 12, in which the two sample containers 14, the microphone apparatuses 16 and the differential amplifier 20 are located, can be formed as a Faraday cage. In particular, the central unit 12 can be formed as an aluminum housing. In order that the electronics of the differential amplifier 20 does not interfere with the measurement in the sample containers 14, the differential amplifier 20 can be arranged in an own shielding chamber 26, which is preferably also formed as a Faraday cage and which is for example provided by means of an aluminum wall between the differential amplifier 20 and the sample containers 14.

For avoiding influences from the outside, in particular by oscillations, which can occur by shocks in the environment of the analysis device 10, the sample containers 14 are mounted by oscillation-damping elements 28, wherein the oscillation-damping elements 28 can for example be rubber feet.

In order to avoid that sound waves coming from the outside influence the measurement, the central unit 16 is particularly preferably arranged in a sound-absorbing housing 30, wherein the sound-absorbing housing can comprise resonators, which minimize a sound from the outside. Furthermore, the sound-absorbing housing 30 can additionally be resiliently mounted by oscillation-damping housing elements 32 against an influence of impact sound. The oscillation-damping housing elements 32 can also be formed as rubber feet.

Despite of all shields and acoustic attenuations against disturbances from the outside, a digitization of the oscillation pattern of the substance can be even further improved if environmental disturbances are kept as low as possible. In particular, the influence of external oscillations, for example by impact sound, can be monitored during the measurement by an oscillation measurement device 34. Thereto, the oscillation measurement device 34 can preferably be connected to the sound-absorbing housing 30. The oscillation measurement device 34 can be a test device for level monitoring, wherein it can be formed to determine an oscillation signal of the analysis device 10 and/or of the environment and to examine if the measured oscillation signal is above a preset oscillation threshold value. The oscillation threshold value can be a previously set tolerance, which is not to be exceeded or undershot upon the measurement. If the measured oscillation signal is above or below the oscillation threshold value, the oscillation measurement device can provide an oscillation warning signal. The oscillation warning signal can for example be a warning lamp, which lights up upon exceeding or undershooting the oscillation threshold value and can thus indicate to the user that the oscillation signal in the environment was too high or too low during the measurement. Thus, the user can recognize that the measurement has to be repeated.

A further improvement is achieved if the environment of the analysis device 10 is mostly free of electromagnetic interfering signals during the measurement, in particular free of electric smog and geopathic interfering zones. In order to determine an electromagnetic interfering signal, therefore, the analysis device 10 can comprise a spectrum analyzer device 36, which can be formed to determine the electromagnetic interfering signal and to examine if the electromagnetic interfering signal is above a preset interfering signal threshold value. If the electromagnetic interfering signal is above the preset gradient threshold value, the spectrum analyzer device 36 can be formed to provide an interference warning signal, which can be displayed to a user. Thus, the user can be warned that the measurement could be erroneous. As the spectrum analyzer device 36, a spectrum analyzer can for example be used, which is connected to an antenna for monitoring electromagnetic interfering signals. Alternatively or additionally, the recording can occur in a so-called absorber room.

In FIG. 2, a perspective view of an analysis device 10 according to an exemplary embodiment is illustrated. In this representation, the central unit 12 is shown, which is formed as an aluminum housing and in which the two identical sample containers 14, which are formed as brass tubes, are arranged. Preferably, the central unit 12 can be closed by a lid 38 during a measurement such that the sample containers 14 are shielded from electromagnetic influences all around.

On the bottom of the sample containers 14, an acoustic lens 40 can respectively be arranged, wherein the microphones of the microphone apparatus 16 are arranged below the acoustic lens 40. A respectively measured signal of the microphone apparatuses 16 can be transferred into the shielding chamber 26 via a respective connecting line 18, wherein the differential amplifier is located in the shielding chamber 26. This means that the electronic components can be accommodated in the front part of the central unit 12, which is formed as the shielding chamber 26. Particularly preferably, the electronic components can be supplied by an external power supply (not shown), such that extraneous magnetic fields from transformers do not intersperse.

In FIG. 3, the analysis device 10 is illustrated in perspective in a further embodiment. In this embodiment, the central unit 12 is arranged in the sound-absorbing housing 30. Herein, the sound absorption can be generated by pyramidal sound absorption plates, which are arranged in the sound-absorbing housing 30.

The arrangement of the central unit 12 shown in FIG. 3 in the sound-absorbing housing 30 can represent a situation just before a measurement of the analysis device 10. Herein, the sample containers 14 can be closed by respective closing lids 42, wherein the substance can be positioned in one of the two sample containers 14 and wherein the other sample container 14 is empty or comprises an empty protective vessel. Before the measurement of the oscillation pattern of the substance, the lid 38 of the central unit and the lid 44 of the sound-absorbing housing can also be closed. Subsequently, the measurement can be started.

In FIG. 4, a schematic method diagram for determining an oscillation pattern of a substance with the analysis device 10 according to an exemplary embodiment is illustrated. In a step S10, the current supply to the analysis device 10 can be established, and the central unit 12 can for example be connected to a microphone input of the computer device 22. Then, the signal of the differential amplifier 20 can be compensated for before arranging the substance in a sample container 14. This means that the signal of the differential amplifier 20 can be adjusted to zero such that in-phase parasitic oscillations from both sample containers 14 compensate for each other.

In a step S12, the substance can then be arranged in one of the two sample containers 14, wherein the substance is preferably introduced into the sample container 14 in a protective vessel, in particular a glass tube. Upon introducing the substance, it is preferably to be taken care that a user wears a protective equipment to avoid contaminations by the user. Thus, the user can preferably wear protective gloves, in particular white thread gloves, and a mask during positioning of the substance in the sample container 14. Furthermore, tweezers suitable as a gripping tool can be used for positioning the substance. In the other sample container 14, in which the substance is arranged, the same protective vessel without the substance can preferably be arranged to compensate for an influence of the protective vessel on the measurement.

Subsequently, in a step S14, the respective sample container 14 can be closed by means of a closing lid 42. In addition, the lid 38 of the central unit 12 can also be closed such that the central unit 12 represents a closed Faraday cage.

In a step S16, the central unit 12 can be arranged in the sound-absorbing housing 30, and the housing lid 44 of the sound-absorbing housing 30 can be closed. Preferably, step S16 can be performed before the actual measurement, wherein arranging the central unit 12 in the sound-absorbing housing 30 can for example also occur before step S10 and only closing the housing lid 44 is performed in the illustrated order.

Finally, the oscillation pattern can be measured at the differential amplifier 20 in a step S18, wherein a measurement duration is preferably preset hereto, which is identical for all of the measurements. Thus, a recording time can for example be at least 25 s.

The thus digitized oscillation pattern can then be stored on the storage unit 24 for example by means of an audio software in the computer device 22, in particular as a wave file, and be designated corresponding to the substance. Furthermore, a text can optionally be complemented to the file. The digitizing measurement can preferably be performed with a setting of 48 KHz stereo, at 16 bits and 187 KB/s or a higher resolution.

After measuring the substance, the protective vessel provided with the substance can be removed and the sample container 14 can be loaded with the next sample. Herein, a new protective vessel is preferably always used.

A preferred application of the analysis device 10 relates to ascertaining a radiation of biological objects, biological substances or homeopathic agents or the therapeutically used substances and medicaments thereof. Therein, the idea is based on the quantum physical assumption that energy states of substances and objects are present as discrete oscillators and all bodies are represented by certain frequency patterns, which they radiate as a field into their environment. Therein, it is irrelevant in which form this oscillation is present or electric, magnetic, electromagnetic, mechanic, acoustic, as gravitational waves, time waves etc. and how their respective characteristic form communicates to the environment. The previous problem was in that it is only possible under certain physically defined conditions heretofore to capture these radiations with the available measurement technology. Thus, it is for example possible to capture the radiation from a glowing metal piece with a spectrometer and to visualize it as energy frequency diagram. In the astronomy too, conclusions to the radiation sources are drawn from the received radiation spectra.

Since, according to current state of knowledge, it was not succeeded to evidence and make visualizable the radiations of the substances with methods usual thereto, it had to be concluded that the signals (oscillation spectra) to be measured are too low in their intensity and either are not present in classical deterministic form, such that they defy the evidence by means of the usual, known measurement technology. Thus, it was assumed that they are hidden in the level of the background noise, are not present in classical deterministic form and additionally disappear in the usual noise level of the respectively used measurement and analysis technology. Thus, it was not succeeded in all of the previously known methods to metrologically evidence and graphically represent the radiation of the substance to be digitized as a frequency spectrum. Therein, the respectively obtained electrical signal was always electronic noise. Nevertheless, most of these methods proved to be more or less successful in the transfer of the information upon application to the human, comparable to the effect of homeopathic agents of high potency. Therein, the question, where and how the information is stored and transferred, remains unanswered.

Own theoretical examinations, experiments and developments allow the conclusion that the present signals appear both as a modification of the noise and are below the noise level in their intensity, that is are hidden in the level of the background noise, are not present in classical deterministic form and additionally disappear in the usual noise level of the respectively used measurement and analysis technology.

Considering this realization, special microphones were used in the performed laboratory experiments as transducer elements (microphone apparatuses), which capture both inductive and capacitive and additional acoustic components. The consideration to use this type of the transducers, is also substantiated in that information are transferred as soliton oscillations in the body, wherein oscillations in the biological area are to be understood by soliton oscillations, which are composed of mixed components of acoustic and electromagnetic portions.

Presently, a compensation measurement specially developed for this area of application was used as the procedural principle. The signals from two completely identical transducer lines are supplied to an extremely low-noise compensation amplifier, such that a large compensation for in-phase parasitic oscillations can be achieved. Before introducing the sample to be analyzed, this compensation is adjusted towards zero. After introducing the sample, only the signal changes thus remain for further processing, which have been caused by the sample and characterize it in the noise signal.

Overall, the examples show, how oscillation patterns of substances can be provided for providing simulation effects of different preparations by the invention.

The invention claimed is:

1. An analysis device for determining an oscillation pattern of a substance, comprising:
   a central unit with two identical sample containers, two microphone apparatuses, a differential amplifier, opaque closing lids, connecting lines and oscillation-damping elements;
   wherein the sample containers are closable by the respective opaque closing lids, wherein the interior of the sample containers is shielded by walls of the sample containers and the closing lids from all sides from optical radiation after closing;
   wherein one of the microphone apparatuses is respectively arranged in the respective sample containers;
   wherein the microphone apparatuses are electronically coupled to the differential amplifier via the respective connecting lines, wherein the connecting lines are each identically constructed;
   wherein the differential amplifier is formed to compensate for in-phase parasitic oscillations from both sample containers and to determine the oscillation pattern of the substance upon introduction of the substance into only one of the two sample containers; and
   wherein the analysis device does not comprise an excitation source, by which the sample containers and/or the substance are excitable in one of the two sample containers;
   wherein the two sample containers are mounted by the oscillation-damping elements, which are formed to absorb and reduce oscillations,
   wherein the central unit is formed as a Faraday cage; and
   wherein the analysis device comprises a sound-absorbing housing, wherein the central unit is arranged in the sound-absorbing housing.

2. The analysis device according to claim 1, wherein the analysis device comprises a computer device with a storage unit, wherein the computer device is configured and arranged to digitally store the oscillation pattern of the substance in the storage unit.

3. The analysis device according to claim 1, wherein the microphone apparatuses each comprise a capacitor microphone.

4. The analysis device according to claim 1, wherein the microphone apparatuses each comprise an acoustic lens.

5. The analysis device according to claim 1, wherein the central unit of the analysis device comprises a shielding chamber, wherein the differential amplifier is electromagnetically shielded from the sample containers and the microphone apparatuses by the shielding chamber, wherein the shielding chamber is formed as a Faraday cage.

6. The analysis device according to claim 1, wherein the analysis device comprises oscillation-damping housing elements, wherein the sound-absorbing housing is mounted by the oscillation-damping housing elements.

7. The analysis device according to claim 1, wherein the analysis device comprises an oscillation measurement device, which is formed to determine an influence of external oscillations as an oscillation signal and to provide an oscillation warning signal if the oscillation signal is above or below a preset oscillation threshold value.

8. The analysis device according to claim 1, wherein the analysis device comprises a spectrum analyzer device, which is formed to determine an electromagnetic interfering signal and to provide an interference warning signal if the electromagnetic interfering signal is above a preset interfering signal threshold value.

9. A method for determining an oscillation pattern of a substance using the analysis device according to claim 1, comprising the steps of:

arranging the substance in one of the two sample containers;

closing the sample containers and/or the central unit;

measuring the oscillation pattern at the differential amplifier for a preset measurement duration.

10. The method according to claim 9, wherein before arranging the substance in one of the sample containers, a signal of the differential amplifier is compensated for.

11. The method according to claim 9, wherein a protective vessel with the substance is arranged in the sample container and a further identical protective vessel without the substance is arranged in the other sample container.

12. The method according to claim 9, wherein before measuring the oscillation pattern, the central unit is arranged in a sound-absorbing housing.

13. The method according to claim 11, wherein the protective vessel is a glass tube.

* * * * *